US012647355B2

(12) United States Patent
Wei et al.

(10) Patent No.: US 12,647,355 B2
(45) Date of Patent: Jun. 2, 2026

(54) MESSAGE ENCAPSULATION AND DE-ENCAPSULATION METHOD AND DEVICE, STORAGE MEDIUM, AND ELECTRONIC DEVICE

(71) Applicant: ZTE Corporation, Shenzhen (CN)

(72) Inventors: Yuehua Wei, Shenzhen (CN); Zheng Zhang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 92 days.

(21) Appl. No.: 18/270,055

(22) PCT Filed: Aug. 20, 2021

(86) PCT No.: PCT/CN2021/113849
§ 371 (c)(1),
(2) Date: Jun. 28, 2023

(87) PCT Pub. No.: WO2022/142390
PCT Pub. Date: Jul. 7, 2022

(65) Prior Publication Data
US 2024/0073128 A1 Feb. 29, 2024

(30) Foreign Application Priority Data
Dec. 29, 2020 (CN) .......................... 202011602820.X

(51) Int. Cl.
*G06F 15/173* (2006.01)
*H04L 9/40* (2022.01)
(Continued)

(52) U.S. Cl.
CPC .......... *H04L 45/566* (2013.01); *H04L 45/741* (2013.01); *H04L 63/0876* (2013.01)

(58) Field of Classification Search
CPC .. H04L 45/566; H04L 45/741; H04L 63/0876
(Continued)

(56) References Cited

U.S. PATENT DOCUMENTS

2013/0315102 A1* 11/2013 Kahng .................... H04W 4/02
370/254
2018/0375763 A1* 12/2018 Brissette ................ H04L 45/24
(Continued)

FOREIGN PATENT DOCUMENTS

CN       106656524 A   *  5/2017
CN       112054959 A      12/2020
(Continued)

OTHER PUBLICATIONS

RFC 8296 BIER MPLS Encapsulation Jan. 2018 (Year: 2018).*
(Continued)

*Primary Examiner* — Imad Hussain
(74) *Attorney, Agent, or Firm* — CANTOR COLBURN LLP

(57) ABSTRACT

Provided is a message encapsulation and de-encapsulation method and device, a storage medium, and an electronic device. The message encapsulation method includes: encapsulating a bit indexed explicit replication (BIER) header in an IPv6 extended header of an IPv6 message in combination with a generic fragmentation header (GFH), a generic encapsulating security payload (GESP), or a generic authentication header (GAH). The problem in the related art of how to combine a GFH mechanism with a BIER header encapsulated in an IPv6 extended header can be solved; when the BIER header is encapsulated in the IPv6 extended header, the BIER header can be combined with the GFH/GESP/GAH, thereby simply and efficiently realizing fragmentation, encapsulating security and authentication functions of a BIER multicast message.

4 Claims, 8 Drawing Sheets

(51) Int. Cl.
　　*H04L 45/00*　　　　(2022.01)
　　*H04L 45/741*　　　(2022.01)
(58) Field of Classification Search
　　USPC .......................................................... 709/238
　　See application file for complete search history.

(56) References Cited

U.S. PATENT DOCUMENTS

| | | | | |
|---|---|---|---|---|
| 2019/0296922 | A1* | 9/2019 | Dutta | ................... H04L 12/1886 |
| 2021/0266189 | A1* | 8/2021 | Xie | ...................... H04L 12/4641 |
| 2022/0200820 | A1* | 6/2022 | Xie | ...................... H04L 12/4633 |
| 2022/0337521 | A1* | 10/2022 | Xie | ...................... H04L 12/4633 |
| 2023/0127464 | A1* | 4/2023 | Xiong | ................... H04L 45/566 |
| | | | | 709/238 |

FOREIGN PATENT DOCUMENTS

| | | | | |
|---|---|---|---|---|
| CN | 11305529 | A | 6/2021 | |
| EP | 3965381 | A1 * | 3/2022 | ......... H04L 12/1854 |
| EP | 4020908 | A1 * | 6/2022 | ............. H04L 45/06 |
| WO | 2019180306 | A1 | 9/2019 | |
| WO | 2020244651 | A1 | 12/2020 | |

OTHER PUBLICATIONS

Xie et al. "Encapsulation for BIER in Non-MPLS IPV6 Networks". Draft 5. Jan. 14, 2020. pp. 1-17. (Year: 2020).*

International Search Report for corresponding application PCT/CN2021/113849 filed Aug. 20, 2021; Mail date Nov. 19, 2021.

European Search Report for corresponding application EP21913137; Mail date Jun. 4, 2024.

Generic Transport Functions, Z. Zhang Nov. 2020.

Internet Engineering Task Force, Jul. 2017, Internet Protocol Version.

Mcbride Futurewei, Bier IPV6 Requirements: Jul. 10, 2020, pp. 1-17, XP015140523.

Mcbride Futurewei, Bier IPV6 Requirements: May 30, 2019, pp. 1-12, XP015133127.

Xie Huawei Technologies, "Encapsulation for Bier in Non MPLS IPV6 Networks", Jul. 13, 2020, pp. 1-21, XP015140848.

Zhang ZTE, Bier IPV6 Requirements: Jul. 30, 2020, pp. 1-8, XP015141226.

* cited by examiner

Input/output device
108

Transmission
device 106

Processor 102

Memory
104

Encapsulate a BIER header in an IPv6 extended header of an
IPv6 message in combination with a GFH, a GESP, or a GAH

S202

De-encapsulating a BIER header from an IPv6 extension header
of an IPv6 message, wherein the BIER header is combined with
a GFH, a GESP or a GAH, and is encapsulated in the IPv6
extension header

S302

Encapsulate GFH — 701 encapsulate DOH, DOH NH set to 59 — 702

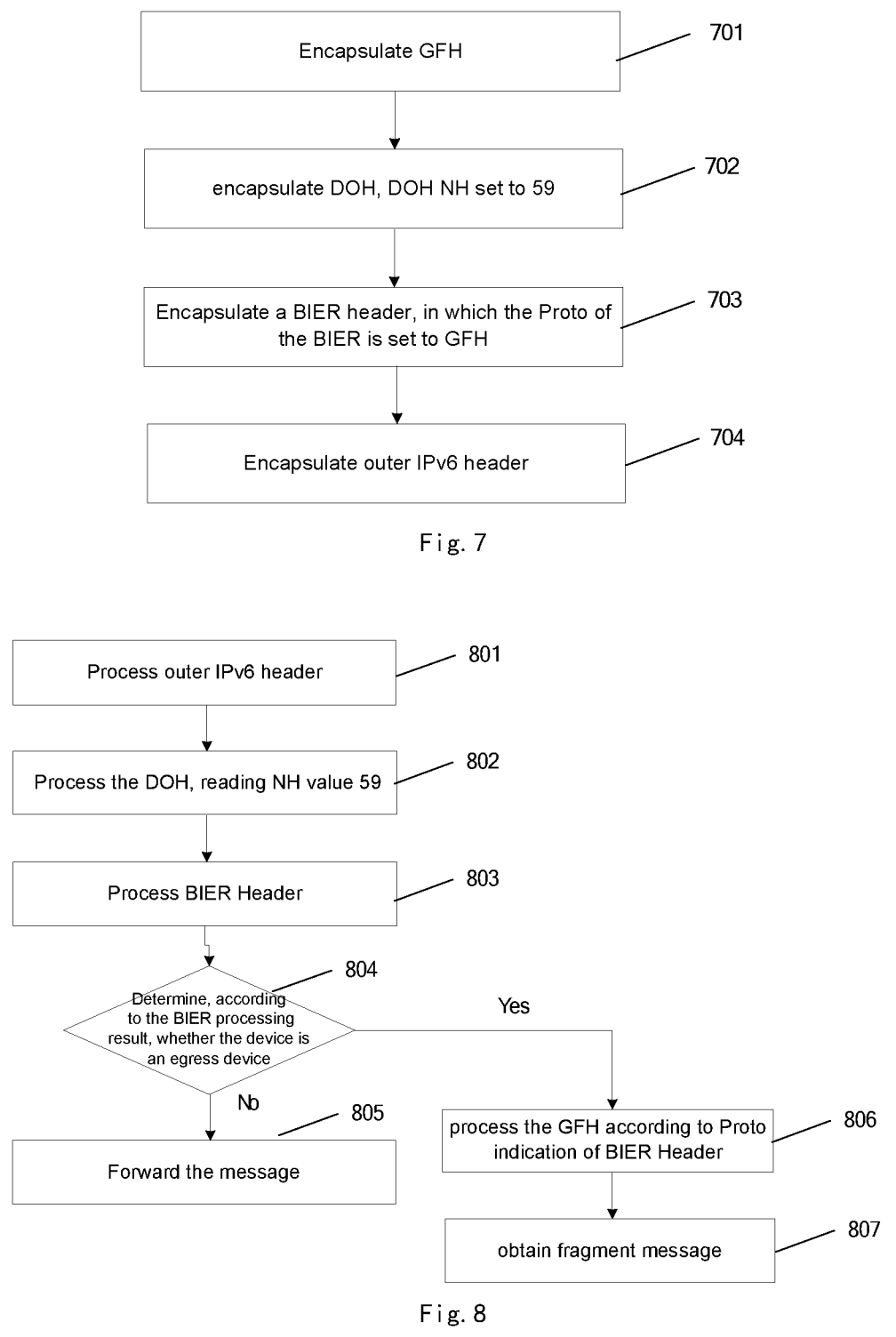

Encapsulate a BIER header, in which the Proto of the BIER is set to GFH — 703

Encapsulate outer IPv6 header — 704

Fig. 7

Process outer IPv6 header — 801

Process the DOH, reading NH value 59 — 802

Process BIER Header — 803

Determine, according to the BIER processing result, whether the device is an egress device — 804

Yes

No

Forward the message — 805 process the GFH according to Proto indication of BIER Header — 806 obtain fragment message — 807

Fig. 8

```
┌─────────────────────────────────────┐
│      Encapsulate a data message      │────  901
└─────────────────────────────────────┘
                   │
                   ▼
┌─────────────────────────────────────┐
│          Encapsulate a DOH           │────  902
└─────────────────────────────────────┘
                   │
                   ▼
┌─────────────────────────────────────┐
│       Encapsulate a BER header       │────  903
└─────────────────────────────────────┘
                   │
                   ▼
┌─────────────────────────────────────┐
│   Encapsulate an outer IPv6 header   │────  904
└─────────────────────────────────────┘
```

F i g. 9

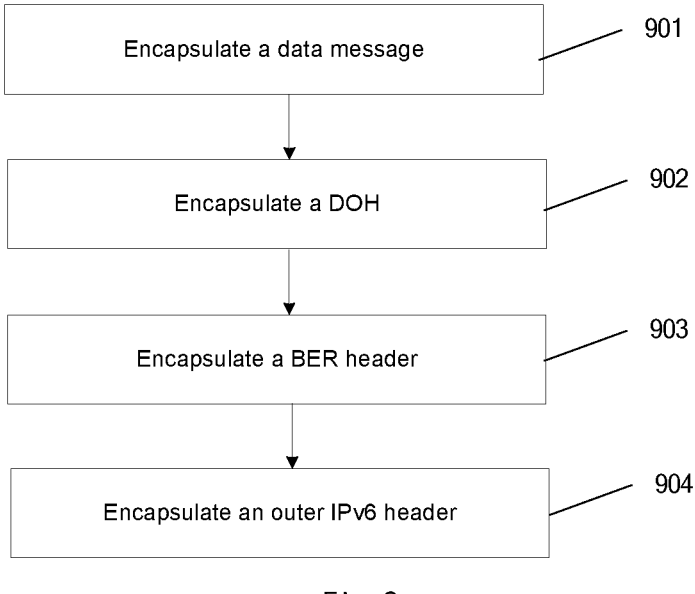

F i g. 10

First encapsulation module ⟋152

Fig.15

Decapsulation module ⟋162

Fig. 16

MESSAGE ENCAPSULATION AND DE-ENCAPSULATION METHOD AND DEVICE, STORAGE MEDIUM, AND ELECTRONIC DEVICE

CROSS-REFERENCE TO RELATED APPLICATION

The present disclosure is based upon and claims the priority of the Chinese Patent Application No. CN202011602820.X, filed on 29 Dec. 2020, the content of which is incorporated herein by reference in its entirety.

TECHNICAL FIELD

Embodiments of the present disclosure relate to the field of communications, and in particular, to a message encapsulation and de-encapsulation method and device, storage medium, and electronic device.

BACKGROUND

IPv6 is an abbreviation of Internet Protocol Version 6, and is a next generation IP protocol designed by the Internet Engineering Task Force (IETF) to replace IPv4, and its address number may be enough for every grain of sand in the world. After years of development, the latest standard of the IPv6 technology is RFC8200. The biggest problem of the IPv4 is that the network address resource is insufficient, which seriously restricts the application and development of the Internet. The use of IPv6 can not only solve the problem of the number of network address resources, but also solve the obstacle of connecting various access devices to the Internet.

BIER (Bit Indexed Explicit Replication) (RFC8279) is a new multicast data forwarding technology, and in this technology, nodes at a network edge are all represented by only one bit, Multicast traffic is transmitted in an intermediate network, a special BIER header is additionally packaged, and this message header labels all destination nodes of the multicast stream in the form of a bit string. The intermediate network forwarding node routes the traffic according to the bits, so as to ensure that the traffic can be sent to all destination nodes. The forwarding device of the intermediate node forms a BIFT (Bit Index Forwarding Table) table for guiding BIER forwarding in advance by means of a routing protocol, such as an OSPF (Open Shortest Path First) protocol and an ISIS (Intermediate System-to-Intermediate System) protocol in a three-layer network, and when receiving the traffic encapsulating the BIER header, forwards the message to the destination node according to the BIFT. The data plane forwarding technology such as the BIER does not have the problem of establishing a multicast tree, thereby eliminating the time delay of establishing a multicast tree; and when a link or node problem occurs in a network, the convergence speed is the same as the OSPF or ISIS protocol, which reduces a huge time delay compared with the original multicast tree reconstruction.

The IPv6 technology has been studied for many years. In the slicing mechanism defined in the RFC8200, when a message is too large and a path cannot be directly transmitted, a good mechanism is provided to change the message into a plurality of small messages for transmission. In addition, the ESP (RFC4303) also provides a guarantee mechanism for the security of the message. When the two extension headers are used separately, there is no problem; however, if the two extension headers are combined with the BIER technology, a message cannot be organized, and a situation that logical chaos cannot be parsed may occur.

draft-xie-bier-ipv6-encapsulation-08 puts a fragment or an AH/ESP (Authentication Header/Encapsulating Security Payload) extension header as an IPv6 common extension header in a BIER option header of the DOH, and then requests that only a BIER egress device needs to process the fragment/AH/ESP extension header. Such an implementation has special requirements on an intermediate device (non-ingress/egress device) of the network. That is, according to the IPv6 message processing flow specified in the RFC8200 international standard, the intermediate device will process the fragmentations/AH/ESP extension headers subsequently after processing the DOH. However, actually, the fragmentations/AH/ESP extension headers do not need to be processed by the intermediate device, thereby causing redundant judgment or processing, reducing device performance, and possibly causing error processing. However, if other means such as configuration or a mandatory command is adopted to enable the intermediate device not to process the fragment/AH/ESP extension header behind the BIER option header of the DOH, this process is not a general process, and other normal IPv6 message processing without carrying a BIER header will be affected. In addition, if the IPv6 header is packaged after the DOH carrying the BIER option header, and then the fragment/AH/ESP extension header is placed behind the IPv6 header, the filling-in of the destination IPv6 address in the IPv6 header becomes a problem, and if the destination IPv6 address is 0, the device needs to perform special processing on the IPv6 address in this case, and allocating a special address separately increases the control complexity.

draft-zzhang-tsvwg-generic-transport-functions-00 proposes a generic fragmentation header mechanism GFH (Generic Fragmentation Header), which can be combined with other technologies, so as to solve the problem of processing logic of a message on a transmission path. For example, it can be easily used in combination with the BIERin6 technique (draft-zhang-bier-bierin6-07). However, when a BIER header (whose format is the same as or similar to that defined in RFC8296) is combined with IPv6 by using a method similar to that in draft-xie-bier-ipv6-encapsulation, an efficient and concise solution has not been proposed yet.

SUMMARY

Embodiments of the present disclosure provide a message encapsulation and de-encapsulation method and device, storage medium, and electronic device, so as to at least solve the problem in the related art of how a general fragment header mechanism is used in combination with a BIER header encapsulated in an IPv6 extension header.

According to an embodiment of the present disclosure, a message encapsulating method is provided, the method comprising:

A bit index explicit replication (BIER) header is encapsulated in an IPv6 extension header of an Internet protocol version 6 (IPv6) message in combination with a generic fragment header (GFH), a Generic Encapsulating Security Payload (GESP) or a Generic Authentication Header (GAH).

According to another embodiment of the present disclosure, also provided is a message decapsulation method. The method comprises:

Decapsulating a bit index explicit replication (BIER) header from an IPv6 extension header of an IPv6 message of Internet protocol version 6, wherein the BIER header is combined with a generic fragment header GFH, a generic encapsulating security payload header GESP or a generic authentication header GAH, and is encapsulated in the IPv6 extension header.

According to another embodiment of the present disclosure, also provided is a message encapsulation device. The device comprises:

A first encapsulation module, configured to encapsulate a bit indexed explicit replication (BIER) header in an IPv6 extension header of an Internet protocol version 6 (IPv6) message in combination with a generic fragment header (GFH), a generic encapsulating security header (GESP) or a generic authentication header (GAH).

According to another embodiment of the present disclosure, also provided is a message decapsulation device. The device comprises:

A decapsulation module, configured to decapsulate a bit index explicit replication (BIER) header from an IPv6 extension header of an IPv6 message, wherein the BIER header is combined with a generic fragment header GFH, a generic encapsulating security header GESP or a generic authentication header GAH, and is encapsulated in the IPv6 extension header.

According to another embodiment of the present disclosure, a computer-readable storage medium is further provided, wherein the storage medium stores a computer program, and the computer program is configured to execute the steps in any method embodiment when running.

According to another embodiment of the present disclosure, also provided is an electronic device, comprising a memory and a processor, wherein the memory stores a computer program, and the processor is configured to run the computer program so as to execute the steps in any one of the method embodiments.

The embodiments of the present disclosure, combined with a generic fragment header GFH, a generic encapsulating security payload header GESP or a generic authentication header GAH, encapsulate a bit indexed explicit replication (BIER) header in an IPv6 extension header of an IPv6 message, and can solve the problem in the related art of how a generic fragment header mechanism is used in combination with a BIER header encapsulated in an IPv6 extension header. In this way, when a BIER header is encapsulated in an IPv6 extension header, a general fragment header/general encapsulating security payload header/general authentication header is combined, and a fragment, encapsulation security and authentication function of a BIER multicast message are simply and efficiently implemented.

BRIEF DESCRIPTION OF THE DRAWINGS

FIG. 7 is flowchart 1 of data message encapsulation according to the preferred embodiment;

FIG. 8 is a first flowchart of de-capsulating a message by a device according to an embodiment of the present invention.

FIG. 9 is flowchart 2 of data message encapsulation according to the preferred embodiment;

FIG. 10 is a second flowchart of de-capsulating a message by a device according to an embodiment of the present invention;

FIG. 15 is a block diagram of a message encapsulating device according to the present embodiment;

FIG. 16 is a block diagram of a message decapsulating device according to this embodiment.

DETAILED DESCRIPTION OF THE EMBODIMENTS

Embodiments of the present disclosure will be described below in detail with reference to the drawings and embodiments.

It should be noted that the terms "first" and "second" in the description, claims, and accompanying drawings of the present disclosure are used to distinguish similar objects, and are not necessarily used to describe a specific sequence or order.

Figures 1, 2, 3:
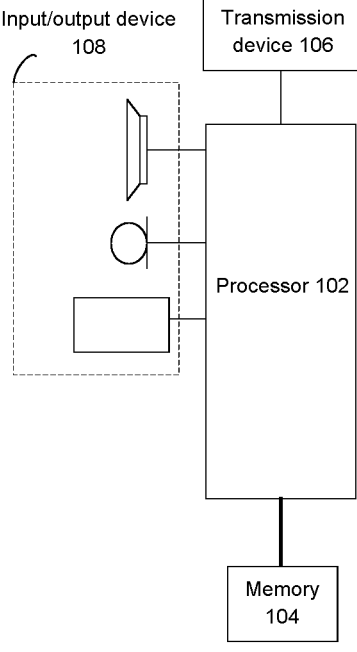
FIG. 1 is a hardware structure block diagram of a mobile terminal of a message encapsulation or decapsulation method according to an embodiment of the present disclosure.
FIG. 2 is a flowchart of a message encapsulation method according to an embodiment of the present disclosure.
FIG. 3 is a flowchart of a message decapsulation method according to an embodiment of the present disclosure.

The method embodiments provided in the embodiments of the present disclosure may be executed in a router, a mobile terminal, a computer terminal, or a similar computing device. Taking the operation on a router as an example, FIG. 1 is a hardware structure block diagram of a mobile terminal in a message encapsulation or decapsulation method according to an embodiment of the present disclosure. As shown in FIG. 1, the router may include one or more (only one is shown in FIG. 1) processors 102 (the processors 102 may include, but are not limited to, a processing device such as a microprocessor (MCU) or a programmable logic device (FPGA)) and a memory 104 configured to store data. The router can further include a transmission device 106 and an input/output device 108 for a communication function. A person of ordinary skill in the art may understand that the structure shown in FIG. 1 is merely exemplary, which does not limit the structure of the router. For example, the router may also include more or fewer components than shown in FIG. 1, or have a different configuration than that shown in FIG. 1.

The memory 104 may be configured to store a computer program, for example, a software program and a module of application software, such as a computer program corresponding to the message encapsulation or decapsulation method in the embodiments of the present disclosure. The processor 102 executes various function application processing by running the computer program stored in the memory 104, thereby implementing the foregoing method. Memory 104 may include high-speed random access memory, and may also include non-volatile memory, such as one or more magnetic storage devices, flash memory, or other non-volatile solid-state memory. In some examples, memory 104 may further include memory remotely located with respect to processor 102, which may be connected to a router over a network. Examples of such networks include, but are not limited to, the Internet, intranets, local area networks, mobile communication networks, and combinations thereof.

The transmitting device 106 is configured to receive or transmit data via a network. Specific examples of the described network may include a wireless network provided by a communication provider of the mobile terminal. In one example, the transmitting device 106 may comprise a Network Interface Controller (NIC) that may be coupled to other network devices via a base station to communicate with the Internet. In one example, the transmitting device 106 can be a Radio Frequency (RF) module for communicating wirelessly with the Internet.

A network slice connection method running on the described router or network architecture is provided in the present embodiment. FIG. 2 is a flowchart of a message encapsulation method according to an embodiment of the present disclosure. As shown in FIG. 2, the flow comprises the following steps:

Step S202, combining with a generic fragment header GFH, a generic encapsulating security payload header GESP or a generic authentication header GAH, encapsulating a bit indexed explicit replication (BIER) header in an IPv6 extension header of an Internet protocol version 6 (IPv6) message.

In an exemplary embodiment, the IPv6 extension header is an HBH (Hop-by-Hop Options Header), a DOH (Destination Options Header), or an RH (Routing Header).

In an exemplary embodiment, the Proto field of the BIER header is configured to a value G_TBD_X for indicating the GFH, the GESP or the GAH, wherein the values G_TBD_X of the GFH, the GESP and the GAH are different.

In an exemplary embodiment, the GFH, the GESP or the GAH is encapsulated, wherein a Next Header in the GFH, the GESP or the GAH indicates a message type transmitted by the BIER.

In an exemplary embodiment, the Next Header field of the IPv6 extension header is set to 59.

In an exemplary embodiment, an IPv6 header is encapsulated at an outer layer of the IPv6 extension header, where a Next Header field in the IPv6 header indicates that the IPv6 header is followed by the HBH, the DOH, or the RH.

In an exemplary embodiment, the Proto field of the BIER header is set to 0 or other reserved values.

In an exemplary embodiment, the GFH, the GESP or the GAH is encapsulated, wherein a Next Header in the GFH, the GESP or the GAH indicates a message type transmitted by the BIER.

In an exemplary embodiment, a Next Header field of the IPv6 extension header is set to indicate an upper-layer protocol value UL_TBD_X of the GFH, the GESP or the GAH.

In an exemplary embodiment, an IPv6 header is encapsulated at an outer layer of the IPv6 extension header, where a Next Header field in the IPv6 header indicates that the IPv6 header is followed by the HBH, the DOH, or the RH.

According to another embodiment of the present disclosure, also provided is a message decapsulation method. FIG. 3 is a flowchart of a message decapsulation method according to an embodiment of the present disclosure. As shown in FIG. 3, the flow comprises the following steps:

Step S302, De-encapsulating a bit index explicit replication (BIER) header from an IPv6 extension header of an Internet protocol version 6 (IPv6) message, wherein the BIER header is combined with a generic fragment header GFH, a generic encapsulating security payload header GESP or a generic authentication header GAH, and encapsulated in the IPv6 extension header.

In an exemplary embodiment, step S302 may specifically include:

S3021, processing the IPv6 extension header and the BIER header in the IPv6 extension header; optionally, before step S3021, the method further comprises decapsulating an IPv6 header, and acquiring an IPv6 extension header HBH, DOH or RH according to a Next Header field of the IPv6 header;

S3022, if it is an intermediate device, performing message forwarding;

S3023, if the egress device is an egress device, perform message processing and forwarding according to the Next Header field of the IPv6 extension header and/or the Proto field in the BIER header. Further, S3023 may specifically include: if the Proto field of the BIER header is a value G_TBD_X for indicating the GFH, the GESP or the GAH, and/or if the Next Header field of the IPv6 extension header is 59, stripping the IPv6 extension header, and parsing a general fragment, general encapsulation security or general authentication message according to the value G_TBD_X of the Proto field of the BIER header; if the Proto field of the BIER header is 0 and/or the Next Header field of the IPv6 extension header is an upper-layer protocol value UL_TBD_X, parsing the generic fragment, generic encapsulating security or generic authentication message according to the upper-layer protocol of the IPv6.

The present disclosure takes encapsulating a BIER header in a DOH, an HBH, or an RH as an example to propose a method used in combination with technologies such as general fragment, universal encapsulation security, and general authentication, so that a BIER message can be used in combination with technologies such as general fragment, universal encapsulation security, and general authentication without being limited to encapsulation forms such as a DOH, an HBH, or an RH, thereby achieving functions such as fragment, encapsulation security, or authentication in a clear logic manner.

The present disclosure proposes two message encapsulation and processing modes, which can realize the combination of a general fragment header/general encapsulating security payload header/general authentication header when a BLER header is encapsulated in an IPv6 extension header, and jump out the restriction of the processing procedure of the RFC8200, thereby realizing the fragment, encapsulation security and authentication functions of a BIER multicast message in a simple and efficient manner.

Figure 4:
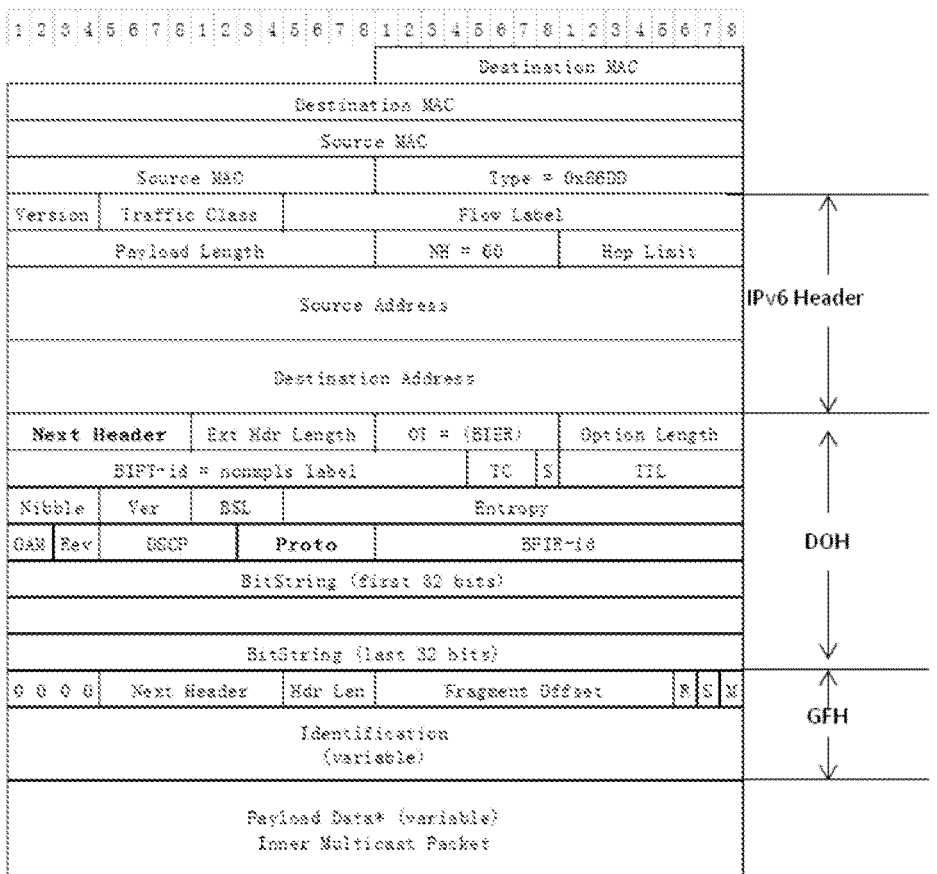
FIG. 4 is a first schematic diagram of message encapsulation according to an embodiment of the present invention.
Figure 5:
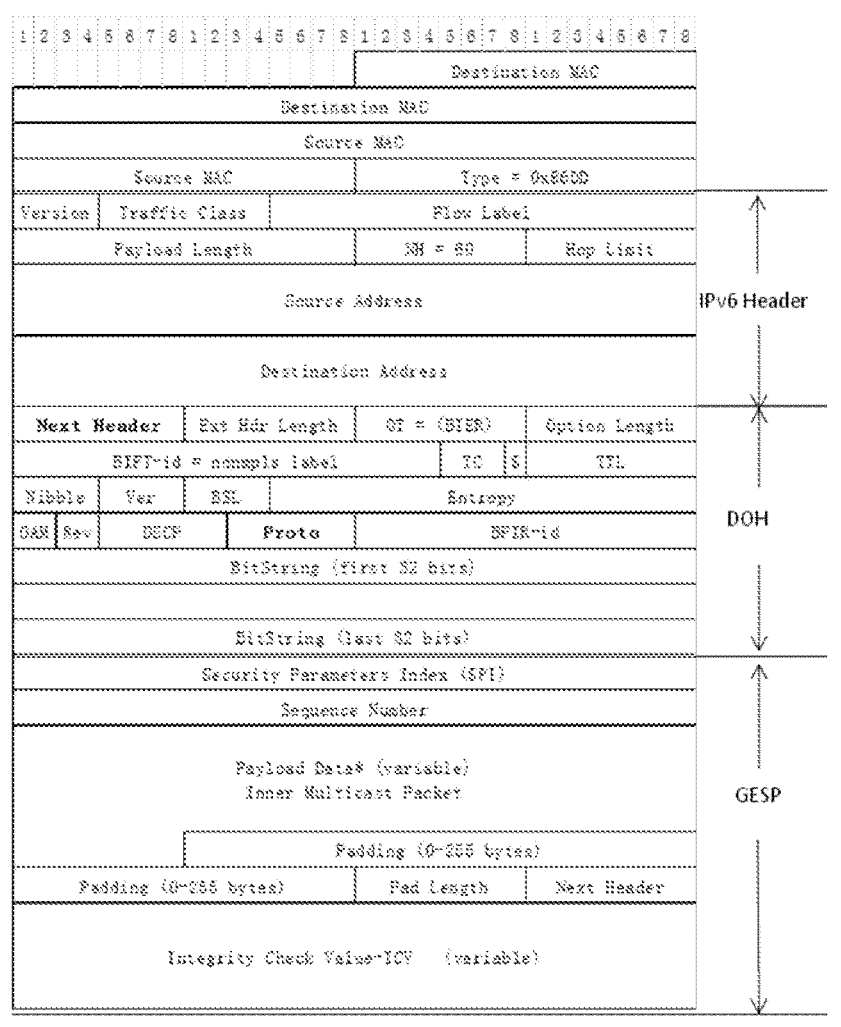
FIG. 5 is a second schematic diagram of message encapsulation according to the present embodiment.

Message encapsulation and processing manner 1: an IPv6 Header encapsulation manner is unchanged, and a Next Header field of the IPv6 Header is still filled with 0, or 60, or 43, which indicates that the IPv6 header is an IPv6 extension header such as an HBH, a DOH, or an RH. However, the Next Header field in the IPv6 extension header such as the HBH/DOH/RH is no longer filled with the value of the IPv6 extension header that is defined in the RFC8200 and indicates the fragment/encapsulating security/authentication, but is filled with 59 (IPv6-NoNxt), and 59 is used to borrow the existing definition of the RFC8200, indicating that there is no other IPv6 extension header or protocol message behind the IPv6 extension header. FIG. 4 is a schematic diagram 1 of message encapsulation according to an embodiment of the present invention. As shown in FIG. 4, for a BIER header encapsulated in an HBH/DOH/RH, a Proto field is filled with a value G_TBD_X representing a GFH. FIG. 5 is a schematic diagram 2 of the message encapsulation according to the present embodiment, as shown in FIG. 5, for the BIER header encapsulated in the HBH/DOH/RH, the Proto field is filled to represent the value of GESP, and for the BIER header encapsulated in the HBH/DOH/RH, the Proto field is filled to represent the GAH, which is similar to FIG. 4 or 5 and will not be repeated here. In this way, additional processing overhead of the device caused by the fragment IPv6 extension header FH, the encapsulating security IPv6 extension header ESP or the authentication header IPv6 extension header AH defined in the HBH/DOH/RH indication RFC8200 can be avoided, and the generic fragment header GFH, the generic encapsulating security payload header GESP or the generic authentication header GAH can be combined with the BIER header encapsulated in the IPv6 extension header such as the HBH/DOH/RH, so as to implement the functions of fragmentation, encapsulating security and authentication of the BIER multicast message. The Next Header in the GFH/GESP/GAH fills in the type of the message transmitted by the BIER, including Ethernet/MPLS/IPv4/IPv6.

After receiving the message, the device first processes the IPv6 extension header such as the HBH/DOH/RH, and then processes the BIER header carried in the HBH/DOH/RH, processes the BIER header, and judges whether to exit the device according to the principle defined in the RFC8279. If the local device is an intermediate device, the HBH/DOH/RH module processes the HBH/DOH/RH module and forwards the HBH/DOH/RH module. If the equipment is an exporting equipment, the HBH/DOH/RH will be stripped, and GFH/GESP/GAH will be processed according to the Proto indication in the BIER header. Thus, the combination of the BIER encapsulated in the IPv6 extension header and the GFH/GESP/GAH is implemented, and the functions of fragmentation, encapsulation security and authentication of the BIER multicast message are simply and efficiently implemented.

For some other transmission technologies, such as a Service Function Chain, a defined NSH (Network Service Header), an encapsulation method and a processing flow similar to the above are adopted, and these technologies can also be implemented in combination with general fragment/general encapsulation security/general authentication processing, thereby ensuring transmission and security of various messages.

The following describes in detail the message encapsulation and processing mode 1 in a specific embodiment.

When the BLER header is at the HBH/DOH/RH, the processing is similar. Only the Next Header in the IPv6 header is set to 60 for the DOH, the HBH is set to 0, and the RH is set to 43. DOH is taken as an example for description in the following. Likewise, when the NSH header of the SFC protocol is located in the HBH/DOH/RH, the processing method is similar.

Figure 6:
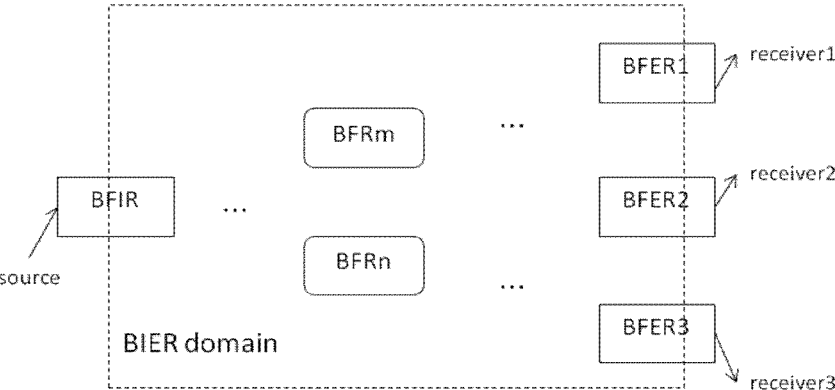
FIG. 6 is a schematic diagram of a BIER technology transmission network according to an embodiment.

FIG. 6 is a schematic diagram of a BIER technology transmission network according to the present embodiment. As shown in FIG. 6, when a network ingress device (BFIR) receives a multicast message, the BFIR discovers that the multicast message needs to be transmitted by means of the BIER technology, and the message is too large and exceeds the maximum transmission unit setting of the network. When fragmentation processing is performed on a message and single fragment encapsulation is performed on the message, the location of a field is as shown in FIG. 4. FIG. 7 is a first flowchart of data message encapsulation according to the preferred embodiment, and as shown in FIG. 7, the method specifically comprises:

Step S701, the encapsulation process of GFH is the same as the fragment processing defined in RFC8200, and the original multicast message type value is filled in the Next Header field of GFH, for example, if the original multicast message is an IPv4 message, then the Next Header field of GFH is filled in 4, if the original multicast message is an IPv6 message, then it is filled in 41. 4 or 41 comply with IANA standards https://www.iana.org/assignments/protocol-numbers/protocol-numbers.xhtml Step S702, DOH encapsulation: the NH of the DOH is set as 59, and the Next Header field of the DOH is filled with 59 (IPv6-NoNxt) instead of the original value 44 (IPv6-Frag) for the fragment header. Using 59 is an existing definition of RFC8200, which indicates that there is no other IPv6 extension header or protocol message behind the DOH extension header.

Step S703, a BIER header is encapsulated, the BIER header is encapsulated into a DOH as an option, and a Proto field of the BIER header is filled with a value G_TBD_X representing a GFH, for example, 10.

This encapsulation manner combines the GFH and the BIER header encapsulated in the DOH to implement fragmenting of a message transmitted by using the BIER, thereby avoiding additional processing overhead of the device caused by inserting the FH header after the DOH.

Step S704, an outer layer IPv6 header is encapsulated, and a Next Header field thereof is filled with 60, indicating that the subsequent part is a DOH.

FIG. 8 is a first flowchart of de-capsulating a message by a device according to an embodiment of the present invention. As shown in FIG. 8, the device includes:

Step 801, the outer-layer IPv6 header is processed, and the extended header DOH is found according to the Next Header indication value 60 of the IPv6 header.

Step 802, processing the DOH, reading the NH value 59, and finding the BIER header according to the option type in the DOH. Because the Next Header field of the DOH is filled with 59(IPv6-NoNxt), it is considered that there is no other IPv6 extension header and other protocol messages after the DOH, which will not cause additional processing overhead of the device and improve the processing and forwarding performance of the device.

Step 803, the BIER header is processed, and the processing procedure of the BIER header is performed according to the principle defined in RFC8279.

Step 804, determining whether it is an exit device according to the BIER processing result, if the determination result is no, executing step S805, and if the determination result is yes, executing step S806;

Step S805, the message is forwarded; if the device is an intermediate device, which corresponds to the BFRm (Bit-Forwarding Router) and BFRn device in FIG. 6, after processing the BIER message, it is found that the present device is not an exit device, and the message is forwarded to the next hop of the BIER after finishing processing the DOH, and the subsequent GFH message is not processed. If the device is found to be an egress device, which corresponds to the BFER1 (Bit-Forwarding Egress Router) or BFER2 or BFER3 device in FIG. 6, the DOH and outer layer IPv6 encapsulation are removed.

Step 806, the subsequent GFH is determined according to the Proto in the BIER header, and the GFH is processed. The processing procedure is described with reference to the definition in draft-zzhang-tsvwg-generic-transport-functions. In this way, the BIER encapsulated in the IPv6 extension header can still be used in combination with the generic fragment header, thereby solving the problem of multicast message transmission exceeding the maximum transmission unit of the network.

Step 807, the fragmented message is obtained, the GFH is processed, the fragmented message is reassembled, and the fragmented message is forwarded to the receiver.

As shown in FIG. 6, after receiving a multicast message, a network ingress device BFIR discovers that encapsulation security needs to be implemented, and encapsulation of a general ESP is referred to as GESP for short, and a basic definition in RFC4303 is adopted. Referring to FIG. 5, FIG. 9 is a second flowchart of data message encapsulation according to an exemplary embodiment. As shown in FIG. 9, the method specifically includes:

Step 901, performing ESP encapsulation on a data message, in which the encapsulation method adopts the definition in RFC4303, and fills an original multicast message type value into a Next Header field of an ESP, for example, if the original multicast message is an IPv4 message, then the Next Header field of the ESP is filled as 4, and if the original multicast message is an IPv6 message, then it is filled as 41.

Step 902, the Next Header field of the DOH is encapsulated and filled as 59 (IPv6-NoNxt), and 59 is an existing definition of the RFC8200, indicating that there is no other IPv6 extension header or protocol message behind the extension header;

Step 903, the BIER header is encapsulated, the Proto is set as G_TBD_X, the BIER header is encapsulated into the DOH as an option, and the Proto field of the BIER header is filled with a value representing GESP, such as 20.

This encapsulation manner combines the GESP with the BIER header encapsulated in the DOH, so as to achieve the function of encapsulating the message transmitted by using the BIER, and avoid the additional processing overhead of the device caused by inserting the ESP extension header after the DOH.

Step 904, encapsulate an outer IPv6 header, encapsulate an outer IPv6 header in the DOH, and fill 60 in a Next Header field of the IPv6 header to indicate that the IPv6 header is a subsequent DOH.

FIG. 10 is a second flowchart of de-capsulating a message by a device according to an embodiment of the present invention. As shown in FIG. 10, the device includes:

Step 1001, the outer-layer IPv6 header is processed, and the extended header DOH is found according to the Next Header indication value 60 of the IPv6 header.

Step 1002, the DOH is processed, the NH is read, and the BIER header is found according to the option type in the DOH. Because the value of the Next Header field of the DOH is 59(IPv6-NoNxt), it is considered that there are no other IPv6 extension headers and other protocol messages behind the DOH, which will not cause an additional processing overhead of the device and improve the processing and forwarding performance of the device.

Step 1003, the BIER header is processed, and the Proto is read to know the subsequent processing flow of the GESP header and the BIER header and whether the egress device is determined according to the principle defined in the RFC8279.

Step 1004, judging whether it is an exit device according to the BIER processing result, if the judgement result is no, executing step S1005, and if the judgement result is yes, executing step S1006;

Step 1005, the message is forwarded; if the device is an intermediate device, which corresponds to the BFRm and BFRn devices in FIG. 6, after the BIER message is processed, it is found that the present device is not an exit device, and the message is forwarded to the next hop of the BIER after the DOH is processed, and the subsequent GESP message is not processed. If the device is found to be an egress device, which corresponds to the BFER1, BFER2, or BFER3 device in FIG. 6, the DOH and outer layer IPv6 encapsulation are removed.

Step 1006, the GESP header is processed according to the Proto indication in the BIER header. The GESP process is performed as defined in RFC4303. In this way, the BIER encapsulated in the IPv6 extension header can still be used in combination with the generic encapsulating security payload header, thereby solving the problem of secure transmission of the multicast message encapsulation.

Step 1007, a secure encapsulated message is obtained, GESP is processed, and after the secure determination of the message is passed, the message is sent to the receiver, and if the message does not pass the secure determination, the message is discarded.

In the foregoing embodiment, the network ingress device may also select another security mode, for example, AH, and then in example 2, the Next Header field of the DOH is still filled with 59(IPv6-NoNxt), indicating that there is no other IPv6 extension header and other protocol messages after the DOH, which will not cause additional processing overhead of the device and improve the processing and forwarding performance of the device; the Proto of the BIER header is also filled with a type value representing GAH, the use of which conforms to RFC4302. Thus, the BIER encapsulated in the IPv6 extension header can still be used in combination with the generic authentication header to solve the multicast message authentication problem.

In addition, according to RFC4303, ESP may also be used in conjunction with AH. The use of AH at this time follows RFC 4303. AH will serve as a component of GESP, at which point the encapsulation method and process flows described above. Thus, the BIER can be used in combination with encapsulation security and authentication at the same time, and the security of a multicast message is improved.

It should be noted that, if the size of a message exceeds the maximum transmission unit setting of the network after GESP or GAH encapsulation is performed on the message, then fragmentation processing is required, and then encapsulation and forwarding are performed.

The second message encapsulation and processing method is as follows: the IPv6 Header is encapsulated without change, and the Next Header field is still filled with 0, 60, or 43, indicating that the header is an HBH, a DOH, or an RHIPv6 extension header. However, the Next Header field in the HBH/DOH/RH cannot fill in the value of the IPv6 extension header for indicating the fragment/encapsulating security/authentication defined in the RFC8200, but can also be filled in the value of UL_TBD_X directly representing the upper layer protocol of GFH/GESP/GAH. In this way, not only the functions of fragment, encapsulating security and authentication are implemented, but also the device jumps out of the processing procedure of the IPv6 extension header defined in the RFC8200, thereby avoiding the additional overhead of processing the IPv6 extension header. For the BIER header encapsulated in the HBH/DOH/RH, the Proto field of the BIER header is filled with 0 or another reserved value, and is not used for determining the subsequent message type. This avoids that both the Next Header of HBH/DOH/RH and the BIER Proto together indicate a possible error by GFH/GESP/GAH. The Next-Header in the GFH/GESP/GAH fills in the type of the message transmitted by the BIER, including Ethernet/MPLS/IPv4/IPv6.

After receiving the message, the device first processes the IPv6 extension header such as the HBH/DOH/RH, and then processes the BIER header carried in the HBH/DOH/RH. The processing procedure of the BIER header and the determination on whether to exit the device are performed according to the principle defined in the RFC8279. Whether to process the GFH/GESP/GAH is determined according to the processing flow of the BIER header, and if it is an intermediate device, the GFH/GESP/GAH is forwarded after processing the HBH/DOH/RH. If an egress device is found, the HBH/DOH/RH is stripped, and the GFH/GESP/GAH is processed according to the Next Header in the HBH/DOH/RH. In this case, because the GFH/GESP/GAH protocol is an upper layer protocol rather than an IPv6 extension header, the BIER node judges whether it needs to be processed; if the local device is a non-exit device, the BIER node does not perform the processing; if the local device is an exit device, the BIER node performs the processing, thereby implementing combined application of the BIER and the GFH/GESP/GAH. Thus, the functions of fragmenting and encapsulating security and authentication of the multicast message are implemented.

Because the GFH/GESP/GAH indicated by the Next Header in the IPv6 extension header of the message is an upper-layer protocol, the processing overhead of the IPv6 extension header of the device is not occupied, and the message processing efficiency of the device can be improved.

For some other transmission technologies, such as a Service Function Chain, a defined NSH (Network Service Header), an encapsulation method and a processing flow similar to the above are adopted, and these technologies can also be implemented in combination with general fragment/general encapsulation security/general authentication processing, thereby ensuring transmission and security of various messages.

It should be pointed out that, in the development of the GFH/GESP/GAH technology, information such as fields, field positions and lengths carried in the GFH may also change in the future; however, the gist of the present disclosure is to realize the combination of a general fragment header/general encapsulating security payload header/general authentication header when a BIER header is encapsulated in an IPv6 extension header, jump out the limitation of the processing procedure of the RFC8200, and simply and efficiently realize the fragment, encapsulation security and authentication functions of a BIER multicast message. In addition, in the IETF standard, the fields such as Next Header and Next protocol, protocol, Proto have equivalent meanings, and all indicate the carried message/protocol type.

The second manner of encapsulating and processing a message is described in detail in the following with reference to specific embodiments.

When the BIER header is located at the HBH/DOH/RH, the processing is similar. The only difference is that the Next Header at the IPv6 header is set to 60 for DOH, the HBH is set to 0, and the RH is set to 43. DOH is taken as an example for description in the following. Likewise, when other protocol forwarding headers such as the NSH of the SFC protocol are located in the HBH/DOH/RH, the processing method is similar.

Figure 11:
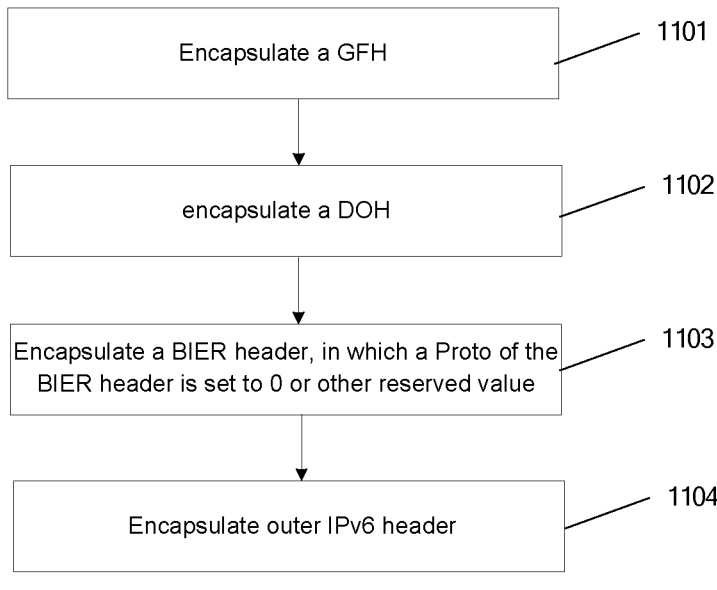
FIG. 11 is a third flowchart of data message encapsulation according to the preferred embodiment.

In the network as shown in FIG. 6, when a network ingress device (BFiR) receives a multicast message, and finds that same needs to be transmitted by means of a BIER technology, and the message is too large and exceeds the maximum transmission unit of the present network, the message is fragmented and then single-message encapsulation is performed. FIG. 11 is a third flowchart of data message encapsulation according to the present preferred embodiment, as shown in FIG. 11, comprising:

Step 1101, a GFH is encapsulated, the GFH encapsulation process is similar to the fragment processing defined in the RFC8200, and the original multicast message type value is filled in the Next Header field of the GFH, for example, if the original multicast message is an IPv4 message, the Next Header field of the GFH is filled in 4, and if the original multicast message is an IPv6 message, the GFH is filled in 41.

Step 1102, encapsulate the DOH. the DOH is encapsulated at the outer layer of the GFH. The Next Header field of the DOH is not filled with the original value 44 (IPv6-Frag) for the fragment header, but is filled with a new value, that is, the value UL_TBD_X of the Upper-Layer header assigned for the GFH, such as 145. This encapsulation not only implements the GFH fragment function, but also enables the device to skip the processing procedure of the IPv6 extension header defined in the RFC8200, thus avoiding the extra overhead of the IPv6 extension header processing.

Step 1103, encapsulate a BIER header, where a Proto of the BIER header is set to 0 or another reserved value, and encapsulate the BIER header into a DOH as an option. This encapsulation manner avoids that both the Next Header of the DOH and the BIER Proto indicate errors possibly caused by the GFH.

Step 1104, encapsulate an outer IPv6 header, and encapsulate an outer IPv6 header in the DOH, where a Next Header field is 60, indicating that the following is the DOH.

Figure 12:
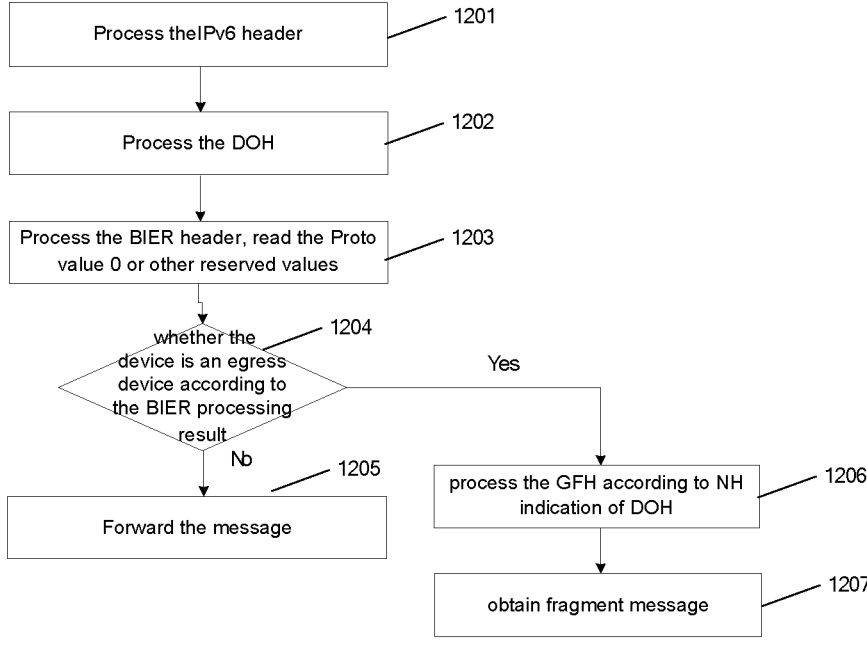
FIG. 12 is a third flowchart of de-capsulating a message by a device according to an embodiment of the present invention.

FIG. 12 is a third flowchart of de-capsulating a message by a device according to this embodiment, and as shown in FIG. 12, the method includes:

Step 1201, process the IPv6 header, and find the extended header DOH according to the Next Header indication value 60 of the IPv6 header.

Step 1202, processing the DOH, because the Next Header field of the DOH is filled with a value (Upper-Layer header) (such as 145) indicating an upper layer protocol, which indicates that the Next Header is not an IPv6 extension header, it is considered that there is no other IPv6 extension header after the DOH. The BIER header is found according to the option type in the DOH.

Step 1203, the BIER header is processed, the Proto value is read as 0 or other reserved values, and the processing flow of the BIER header and the determination of whether to exit the equipment are performed according to the principle defined in the RFC8279.

Step 1204, judging whether the device is an exit device according to the BIER processing result, if the result of the judgment is no, executing step 1205, and if the result of the judgment is yes, executing step 1206;

Step 1205, forwarding the message, and if the device is an intermediate device, corresponding to the BFRm and BFRn devices in FIG. 6, after processing the BIER message, finding that the present device is not an exit device, and after finishing processing the DOH, continuing to forward same to a BIER next hop; if the device is found to be an egress device, corresponding to the BFER1 or BFER2 or BFER3 device in FIG. 6, the DOH and outer IPv6 packages are stripped. In this case, because the GFH is an upper layer protocol rather than an extension header, the BIER node determines whether the GFH needs to be processed; if the GFH is not an egress device, the GFH does not perform the processing; if the GFH is an egress device, the GFH performs the processing. Thus, the use of BIER in combination with GFH can be achieved.

Step 1206, GFH is processed according to the Next Header indication in the DOH, as defined in draft-zzhang-tsvwg-generic-transport-functions-00. In this way, general fragment processing of a multicast message is implemented, and it is ensured that a message exceeding a maximum transmission unit of a current network can still be transmitted successfully.

Step 1207, the message is segmented, the GFH is processed, and the message is segmented and reassembled and then forwarded to the receiver.

Figure 13:
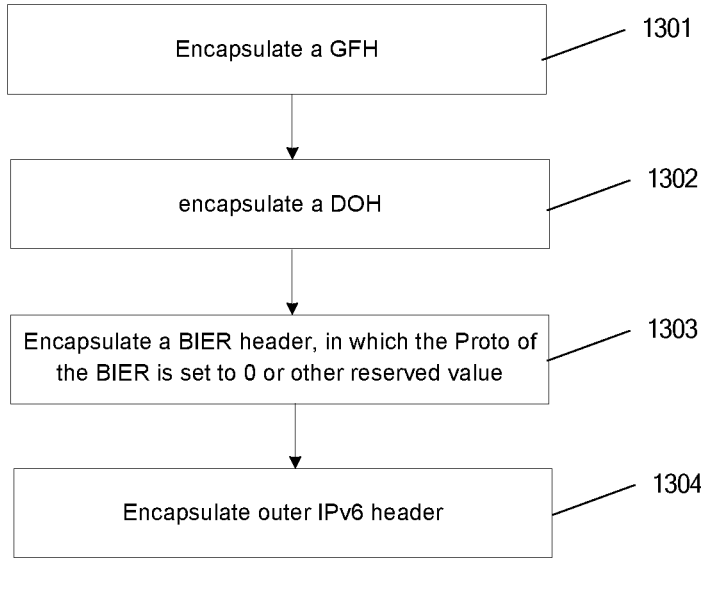
FIG. 13 is a fourth flowchart of data message encapsulation according to the preferred embodiment.

In the network shown in FIG. 6, after receiving a multicast message, a network ingress device BFiR finds that encapsulation security needs to be implemented, and the encapsulation of a general ESP is referred to as GESP for short, and the basic definition in RFC4303 is adopted. FIG. 13 is a fourth flowchart of data message encapsulation according to the preferred embodiment, and as shown in FIG. 13, the method includes the following steps:

Step 1301, encapsulating a GESP. A GESP encapsulation is performed on a data message. The encapsulation method adopts the definition in RFC4303, and fills an original multicast message type value into a Next Header field of the GESP, for example, if the original multicast message is an IPv4 message, then the Next Header field of the GESP is filled as 4, and if the original multicast message is an IPv6 message, then it is filled as 41.

Step 1302, the Next Header field of the DOH is encapsulated, and is not filled with a value 50 indicating the ESP as an original value, but is filled with a new upper layer protocol value allocated for the GESP, such as 180; this encapsulation mode not only implements the GESP encapsulation security function, but also enables the device to jump out of the processing procedure of the IPv6 extension header defined by the RFC8200, thereby avoiding the extra overhead of the IPv6 extension header processing.

Step 1303, encapsulate the BIER header, set the Proto of the BIER to 0 or other reserved values, encapsulate the BIER header into the DOH as an option, and fill the Proto field of the BIER header with 0. This encapsulation manner avoids confusion caused by that both the Next Header of the DOH and the BIER Proto together indicate the GESP.

Step 1304, encapsulate the outer IPv6 header, encapsulate the outer IPv6 header in the DOH, and fill the Next Header field with 60, indicating that the subsequent IPv6 is the DOH.

Figure 14:
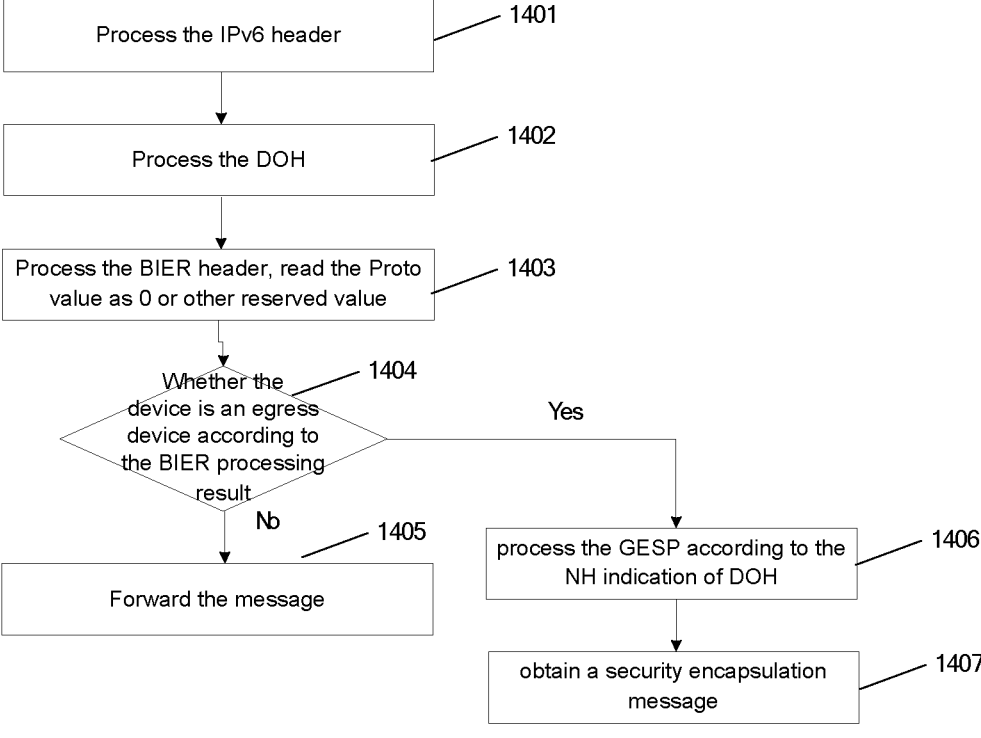
FIG. 14 is a fourth flowchart of de-capsulating a message by a device according to an embodiment of the present invention.

FIG. 14 is a fourth flowchart of de-capsulating a message by a device according to an embodiment of the present invention. As shown in FIG. 14, the device includes:

Step 1401, process the IPv6 header, and find the extended header DOH according to the Next Header indication value 60 of the IPv6 header.

Step 1402, processing the DOH, because the Next Header field of the DOH indicates the upper layer protocol value (Upper-layer header) UL_TBD_X (e.g., 180), which indicates that the Next header is not an IPv6 extension header, the GESP is used as the upper layer protocol. The BIER header is found according to the option type in the DOH.

Step 1403, the BIER header is processed, and the Proto value is read as 0 or other reserved values. The processing flow of the BIER header and the determination of whether to exit the device are performed according to the principle defined in the RFC8279.

Step 1404, judging whether it is an exit device according to the BIER processing result, if the result of the judgment is no, executing step S1405, and if the result of the judgment is yes, executing step S1406;

Step 1405, if the device is an intermediate device, which corresponds to the BFRm and BFRn devices in FIG. 6, after processing the BIER message, it is found that the present device is not an exit device, and after finishing processing the DOH, the device continues to forward to the next BIER hop without processing the subsequent GESP message. If the device is found to be an egress device, corresponding to the BFER1 or BFER2 or BFER3 device in FIG. 6, the DOH and outer IPv6 packages are stripped. In this case, because the GESP is an upper layer protocol rather than an IPv6 extension header, the BIER node determines whether it needs to be processed; if it is a non-egress device, it does not perform the processing; if it is an egress device, it performs the processing. Thus, the use of BIER in combination with GESP is achieved.

Step 1406, the GESP is processed according to the Proto indication in the BIER header. The process of processing the GESP is as defined in RFC4303. In this way, the general encapsulation security processing of the multicast message is implemented, and the security of message transmission is ensured.

Step 1407, obtaining a secure encapsulated message, processing the GESP, and sending the message to the receiver after the message passes the security determination, wherein if the message does not pass the security determination, the message is discarded.

In the foregoing embodiment, the network ingress device may also select another security mode, for example, AH. In embodiment 2, the Next Header field of the DOH is filled with a new upper-layer protocol value allocated to the GAH, indicating that the GAH is not an IPv6 extension header, and does not occupy the processing overhead of the IPv6 extension header of the device, thereby improving the processing and forwarding performance of the device; use of GAH follows RFC4302. In addition, the Proto field of the BIER is filled with 0, so as to avoid confusion caused by that the NextHeader of the DOH and the BIER Proto together indicate the GAH. Thus, the BIER encapsulated in the IPv6 extension header can still be used in combination with the generic authentication header to solve the multicast message authentication problem.

In addition, according to RFC4303, ESP may also be used in conjunction with AH. The use of AH at this time follows RFC 4303. AH will serve as a component of GESP, at which point the encapsulation method and process flows described above. Thus, the BIER can be used in combination with encapsulation security and authentication at the same time, and the security of the multicast message is improved.

It should be noted that, if the size of a message exceeds the maximum transmission unit of the network after GESP or GAH encapsulation is performed on the message, fragmentation processing is required, and then encapsulation and forwarding are performed.

Figures 15, 16:
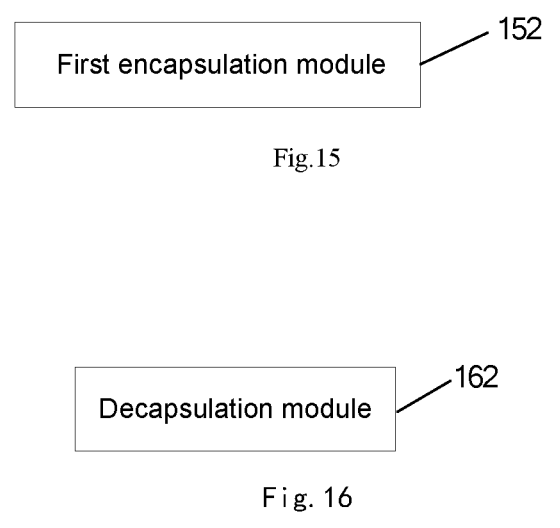

According to another embodiment of the present disclosure, also provided is a message encapsulation device. FIG. 15 is a block diagram of the message encapsulation device according to this embodiment. As shown in FIG. 15, the device includes:

The first encapsulating module 152 is configured to, in combination with a generic fragment header GFH, a generic encapsulating security payload header GESP or a generic authentication header GAH, encapsulate a bit indexed explicit replication (BIER) header in an IPv6 extension header of an Internet Brief of the case version 6 (IPv6) message.

In an exemplary embodiment, the IPv6 extension header is an HBH, a DOH, or an RH.

In an exemplary embodiment, the Proto field of the BIER header is configured to a value G_TBD_X for indicating the GFH, the GESP or the GAH.

In an exemplary embodiment, the device further comprises: a second encapsulating module, configured to encapsulate the GFH, the GESP or the GAH, wherein a Next Header in the GFH, the GESP or the GAH indicates a message type transmitted by the BIER.

In an exemplary embodiment, the Next Header field of the IPv6 extension header is set to 59.

In an exemplary embodiment, the device further comprises: a third encapsulating module, configured to encapsulate an IPv6 header in an outer layer of the IPv6 extension header, wherein a Next Header field in the IPv6 header indicates that the following the IPv6 header is the HBH, the DCH, or the RH.

In an exemplary embodiment, the Proto field of the BIER header is set to 0 or other reserved values.

In an exemplary embodiment, the device further comprises: a fourth encapsulating module, configured to encapsulate the GFH, the GESP or the GAH, wherein a Next Header in the GFH, the GESP or the GAH indicates a message type transmitted by the BIER.

In an exemplary embodiment, the Next Header field of the IPv6 extension header is set to indicate the upper-layer protocol value UL_TBD_X of the GFH, the GESP or the GAH.

In an exemplary embodiment, the device further comprises: a fifth encapsulating module, configured to encapsulate an IPv6 header in an outer layer of the IPv6 extension header, wherein a Next Header field in the IPv6 header indicates that the following the IPv6 header is the HBH, the DCH, or the RH.

According to another embodiment of the present disclosure, a message decapsulation device is also provided. FIG. 16 is a block diagram of the message decapsulation device according to this embodiment. As shown in FIG. 16, the device includes:

A decapsulation module 162, configured to decapsulate a bit index explicit replication (BIER) header from an IPv6 extension header of an Internet Brief of the case version 6 (IPv6) message, wherein the BIER header is combined with a generic fragment header GFH, a generic encapsulating security payload header GESP or a generic authentication header GAH, and is encapsulated in the IPv6 extension header.

In an exemplary embodiment, the decapsulation module 162 includes:

A first processing sub-module, configured to process the IPv6 extension header and the BIER header in the IPv6 extension header;

A forwarding sub-module, configured to forward the message if it is an intermediate device;

A second processing sub-module, configured to, if it is an egress device, perform message processing and forwarding according to the Next Header field of the IPv6 extension header and/or the Proto field in the BIER header.

In an exemplary embodiment, the second processing sub-module is further configured to, if the Proto field of the BIER header is a value G_TBD_X for indicating the GFH, the GESP or the GAH, and/or the Next Header field of the IPv6 extension header is 59, strip the IPv6 extension header, and parse the generic fragment, generic encapsulating security or generic authentication message according to the value G_TBD_X of the Proto field of the BIER header; if the Proto field of the BIER header is 0 and/or the Next Header field of the IPv6 extension header is the upper-layer protocol value UL_TBD_X, parsing the generic fragment, generic encapsulating security or generic authentication message according to the IPv6 upper-layer protocol.

The embodiments of the present disclosure further provide a computer readable storage medium. The computer readable storage medium stores a computer program, wherein the computer program is configured to execute the steps in any one of the method embodiments during running.

In an exemplary embodiment, the computer readable storage medium may include, but is not limited to, any medium that can store a computer program, such as a USB flash drive, a Read-Only Memory (ROM for short), a Random Access Memory (RAM for short), a removable hard disk, a magnetic disk, or an optical disc.

An embodiment of the present disclosure also provides an electronic device, comprising a memory and a processor, wherein the memory stores a computer program, and the processor is configured to run the computer program so as to execute the steps in any one of the method embodiments.

In an exemplary embodiment, the electronic device can further comprise a transmission device and an input/output device, wherein the transmission device is connected to the processor, and the input/output device is connected to the processor.

For specific examples in this embodiment, reference may be made to the examples described in the foregoing embodiments and exemplary embodiments, and details are not repeatedly described in this embodiment.

Obviously, those skilled in the art should understand that each module or each step of the present disclosure may be implemented by a universal computing device, and the modules or steps may be concentrated on a single computing device or distributed on a network formed by a plurality of computing devices, and may be implemented by program codes executable for the computing devices, so that the modules or steps may be stored in a storage device for execution with the computing devices, the shown or described steps may be executed in sequences different from those described here in some cases, or may form each integrated circuit module respectively, or multiple modules or steps therein may form a single integrated circuit module for implementation. Thus, the present disclosure is not limited to any particular combination of hardware and software.

The foregoing descriptions are merely exemplary embodiments of the present disclosure, but are not intended to limit the present disclosure. For those skilled in the art, the present disclosure may have various modifications and variations. Any modifications, equivalent replacements, improvements and the like made within the principle of the present disclosure shall belong to the scope of protection of the present disclosure.

What is claimed is:

1. A message encapsulation method, performed by a network ingress device, comprising:

encapsulating a Bit Indexed Explicit Replication (BIER) header in an IPv6 extension header of an Internet protocol version 6 (IPv6) message in combination with a generic fragment header (GFH), a generic encapsulating security payload header (GESP) or a generic authentication header (GAH);

wherein, a Next Header field of the IPv6 extension header is set to 59, instructing a network intermediate device to skip processing of the GFH, the GESP, or the GAH in the IPv6 extension header; and a Proto field of the BIER header is set to one of G_TBD_X values, wherein the G_TBD_X values comprise three newly defined values for the Proto field, each corresponding to one of the GFH, the GESP and the GAH, thereby instructing a network egress device to identify and decapsulate the GFH, the GESP, or the GAH based on a value of the Proto field;

wherein the method further comprises: encapsulating the GFH, the GESP or the GAH, wherein a Next Header in the GFH, the GESP or the GAH indicates a message type transmitted by the BIER.

2. The method according to claim 1, wherein the IPv6 extension header is a hop-by-hop options header (HBH), a destination options header (DOH), or a routing header (RH).

3. The method according to claim 1, wherein the method further comprises:

encapsulating an IPv6 header at an outer layer of the IPv6 extension header, wherein a Next Header field in the IPv6 header indicates that the IPv6 header is followed by the HBH, the DOH, or the RH.

4. A message decapsulation method, performed by a network egress device, comprising:

decapsulating a bit index explicit replication (BIER) header from an IPv6 extension header of an IPv6 message, wherein the BIER header is combined with a generic fragment header (GFH), a generic encapsulating security payload header (GESP) or a generic authentication header (GAH), and is encapsulated in the IPv6 extension header;

wherein a bit index explicit replication (BIER) header is obtained from an Internet protocol version 6 (IPv6) extension header, wherein the IPv6 extension header is a hop-by-hop options header (HBH), a destination options header (DOH), or a routing header (RH), comprising:

processing the IPv6 extension header and the BIER header in the IPv6 extension header;

performing message processing and forwarding according to the Next Header field of the IPv6 extension header and/or the Proto field in the BIER header;

wherein performing message processing and forwarding according to the Next Header field of the IPv6 extension header and the Proto field in the BIER header comprises:

when the Proto field of the BIER header is a value G_TBD_X for indicating the GFH, the GESP or the GAH, and the Next Header field of the IPv6 extension header is 59, identifying and decapsulating the GFH, the GESP, or the GAH according to a value of the Proto field of the BIER header.

* * * * *